(12) United States Patent
Childs et al.

(10) Patent No.: US 6,295,910 B1
(45) Date of Patent: *Oct. 2, 2001

(54) CLUTCH ASSEMBLY FOR USE WITH A CIRCULAR SAW

(75) Inventors: Daniel K. Childs, Forest Park; Michael Holzer, Wauconda, both of IL (US); Jan P. Houben, Poppel (BE)

(73) Assignee: S-B Power Tool Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/374,018

(22) Filed: Aug. 13, 1999

(51) Int. Cl.[7] ................................................. B26B 5/08
(52) U.S. Cl. .................. 83/698.11; 83/543; 83/698.41; 192/55.1; 192/150; 192/48.3; 81/476
(58) Field of Search ................................. 192/55.1, 56.1, 192/150, 48.3; 173/171, 176, 216; 83/543, 571, 698.11, 698.41; 81/476

(56) References Cited

U.S. PATENT DOCUMENTS

| | | | |
|---|---|---|---|
| 1,564,342 | 12/1925 | Gebhardt et al. . | |
| 2,427,153 | 9/1947 | Mossberg | 81/52.4 |
| 2,482,387 | 9/1949 | Veneman | 81/52.4 |
| 2,675,835 | * 4/1954 | Kiekhaefer | 83/543 |
| 2,917,147 | 12/1959 | Finn | 192/150 |
| 3,038,576 | 6/1962 | Simpson | 192/150 |
| 3,214,773 | 11/1965 | Benjamin et al. | 10/135 |
| 3,315,773 | 4/1967 | Aschauer | 192/48 |
| 3,498,434 | 3/1970 | Richmond | 192/150 |
| 3,503,478 | 3/1970 | Neumann | 192/35 |
| 4,496,136 | 1/1985 | Maeda | 254/350 |
| 4,776,442 | 10/1988 | Young | 192/56.1 |
| 4,883,152 | 11/1989 | Froment | 192/42 |
| 4,949,587 | 8/1990 | Oka | 74/333 |
| 5,107,737 | * 4/1992 | Tagliaferri | 83/698.41 |

* cited by examiner

*Primary Examiner*—W. Donald Bray
(74) *Attorney, Agent, or Firm*—Gardner, Carton & Douglas

(57) ABSTRACT

A circular saw includes a clutch assembly to surround the rotating blade shaft of the saw. The blade shaft is rotated by a shaft having a gear at one end. The clutch assembly includes a clutch gear to engage with the rotating pinion. The clutch gear is held to the blade shaft by a shaft washer that has a frictional material laminated to one end. The shaft washer is pressed to the clutch gear by spring washers.

24 Claims, 6 Drawing Sheets

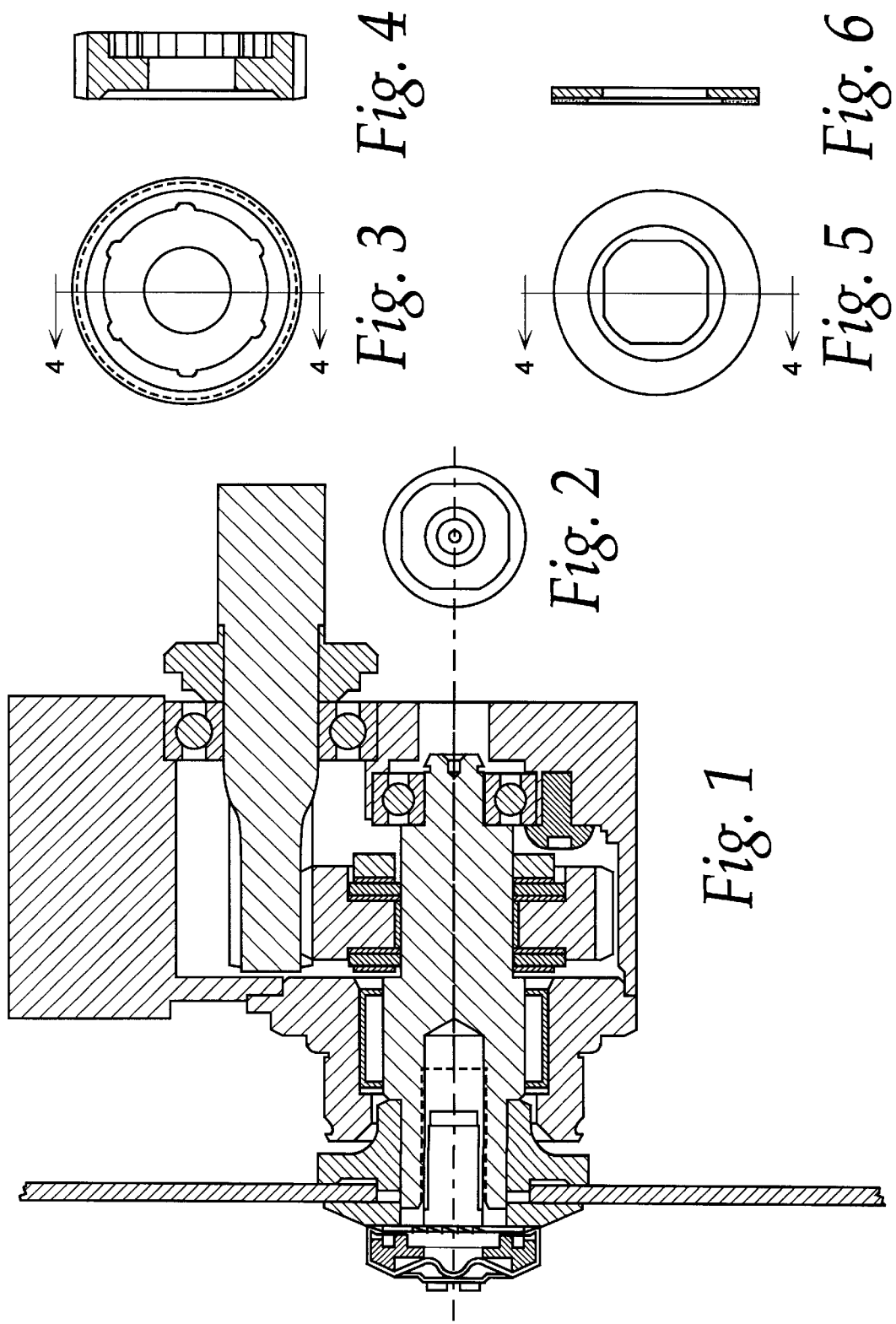

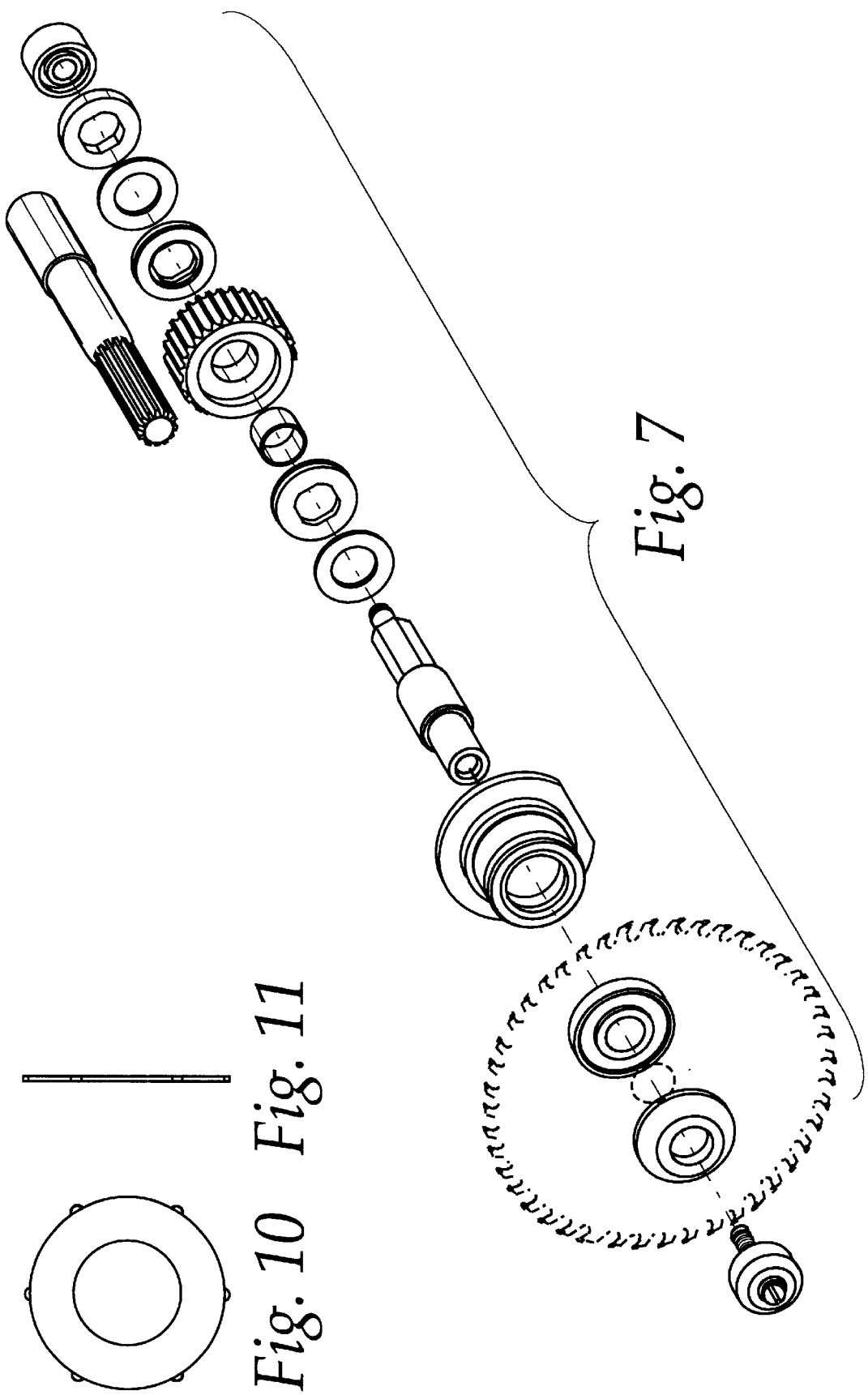

CLUTCH ASSEMBLY FOR USE WITH A CIRCULAR SAW

BACKGROUND OF THE INVENTION

1. Field of the Invention

The present invention relates to circular saws and in particular to clutch assembly positioned between the blade shaft and the shaft rotated by the saw's motor.

2. Scope of the Prior Art

Circular saws use a saw blade to cut materials such as wood. A shaft having a gear or pinion at the distal end that is powered by the saw's motor rotates a blade shaft. Traditionally, the bolt and washer are used to secure the blade into a hole provided in the blade shaft. A wrench is required to tighten the bolt and washer is that the blade remains secured to the shaft. As it can be appreciated, the bolt must be tightened enough to secure the blade for rotation. A user is instructed, however, not to over tighten the bolt and is told to tighten the bolt with the wrench only a one-eighth turn past finger tight. The need to use a wrench can be cumbersome, and it requires that the tool be available.

The material cut by the saw can lock saw blades. Accordingly, the blade will not rotate even though the motor is rotating the shaft and gear. The bolt and washer that secures the blade to the rotating blade shaft therefore functions as a clutch so that the motor does not burn out. If the bolt is over tightened, however, the bolt-and-washer clutch arrangement may not function properly. The saw therefore may tend to kick and the motor may be damaged.

Other power tools that have rotating parts, such as table saws and, power drills etc., also use bolts and other mechanisms to secure the blade or bit to a rotating shaft. These power tools also must protect the motor when the blade or bit is locked. Table saws use the same bolt and washer arrangement. Chucks can be used by other tools such as drills.

It has long been known to use various types of friction-type washers as clutch arrangements for automobiles, agricultural equipment, and other devices. Those clutches drive a member and include an arrangement of Belleville washers and friction plates. When the member is locked, the clutch arrangements allow the motor and engine to continue rotating while the member remains stationary. These clutches tend to be heavy-duty because of the forces involved and the torque required by the equipment.

SUMMARY OF THE INVENTION

The present invention relates to a clutch assembly that is used with a circular saw in which the assembly overcomes the deficiencies of the prior art. The circular saw includes a motor driven shaft that includes a pinion at one end. The pinion drives the clutch assembly that rotates a blade shaft. A blade is secured to the end of the blade shaft.

The clutch assembly of the present invention includes a clutch gear that has a longitudinal hole through its rotating axis. The clutch gear fits over an end of the blade shaft opposing the blade. A bearing function is provided between clutch the clutch gear and the blade shaft. A cylindrical bearing can be served as the bearing friction and as a slip surface. A bearing can be positioned between the clutch gear and the blade shaft. To rotate the blade shaft, the clutch assembly includes a shaft washer on either side of the clutch gear. Belleville, or spring-type, washers bias the shaft washers against the clutch gear. A press-fit washer fits over the end of the blade shaft to hold the clutch assembly against a ledge formed on the shaft. In one embodiment, the shaft washer is made of a suitable friction material that will not bond or weld to the clutch gear, such as bronze. Preferably, the shaft washers include a frictional substrate layered to the side of the washer pressed against the clutch gear. In another embodiment, an assembly of gear washers and shaft washers are arranged on at least one side of the clutch assembly.

In operation, the pinion engages in teeth formed on the outer side of the clutch gear. When the blade is not locked by any means, the clutch gear rotates the gear washers that in turn rotate the blade shaft. Accordingly, the blade cuts the material. When the blade is locked in a position for any reason, the clutch assembly permits the pinion to rotate while the blade holds the blade shaft. The pinion continues to rotate the clutch gear while the torque provided on the blade shaft overcome the friction, which is the result of the clamping force, coefficient of friction, and effective radius, of the surfaces between the clutch gear and the gear washers. Alternatively, the torque is overcome between the faces of the laminated gear washers and the shaft washers.

The use of the clutch assembly of the present invention with a circular saw, or other power tool, overcomes the concerns of over-tightening the bolt to the blade shaft. In addition, the present invention orients the clutch assembly directly between the gear that rotates the shaft and the shaft itself. This provides for increased performance of the clutch assembly, prevents premature motor problems and reduces the chance that the clutch friction fails when the blade is locked. Moreover, the present invention can be modified by provided different coefficient of friction to the surfaces on the gear washers or increasing the number of gear washers and shaft washers to provide different friction between the shaft and the gear. The present invention provides these advantages while maintaining the dimension and weight of the saw. The clutch assembly is also built within the same volume as the gear assembly used by the prior art.

These and numerous other features and advantages of the present invention will become readily apparent from the following description, the accompanying drawings and the appended claims.

BRIEF DESCRIPTION OF THE DRAWINGS

FIG. 1 is a cross-sectional view of a circular saw having a clutch assembly made in accordance with the principles of the present invention;

FIG. 2 is an end view of the blade shaft of the circular saw;

FIG. 3 is an end view of the gear clutch used by the clutch assembly;

FIG. 4 is a cross-sectional view of the gear clutch taken along the line 4—4 in FIG. 3;

FIG. 5 is an end view of a shaft washer used by the clutch assembly;

FIG. 6 is a cross-sectional view of the shaft washer taken along the line 6—6 in FIG. 5;

FIG. 7 is an exploded view of the clutch assembly shown in FIG. 1;

FIG. 10 is an end view of the gear washer used by the alternative embodiment;

FIG. 11 is a side view of the gear washer shown in FIG. 10;

DETAILED DESCRIPTION OF THE PRESENT INVENTION

Figure 8:
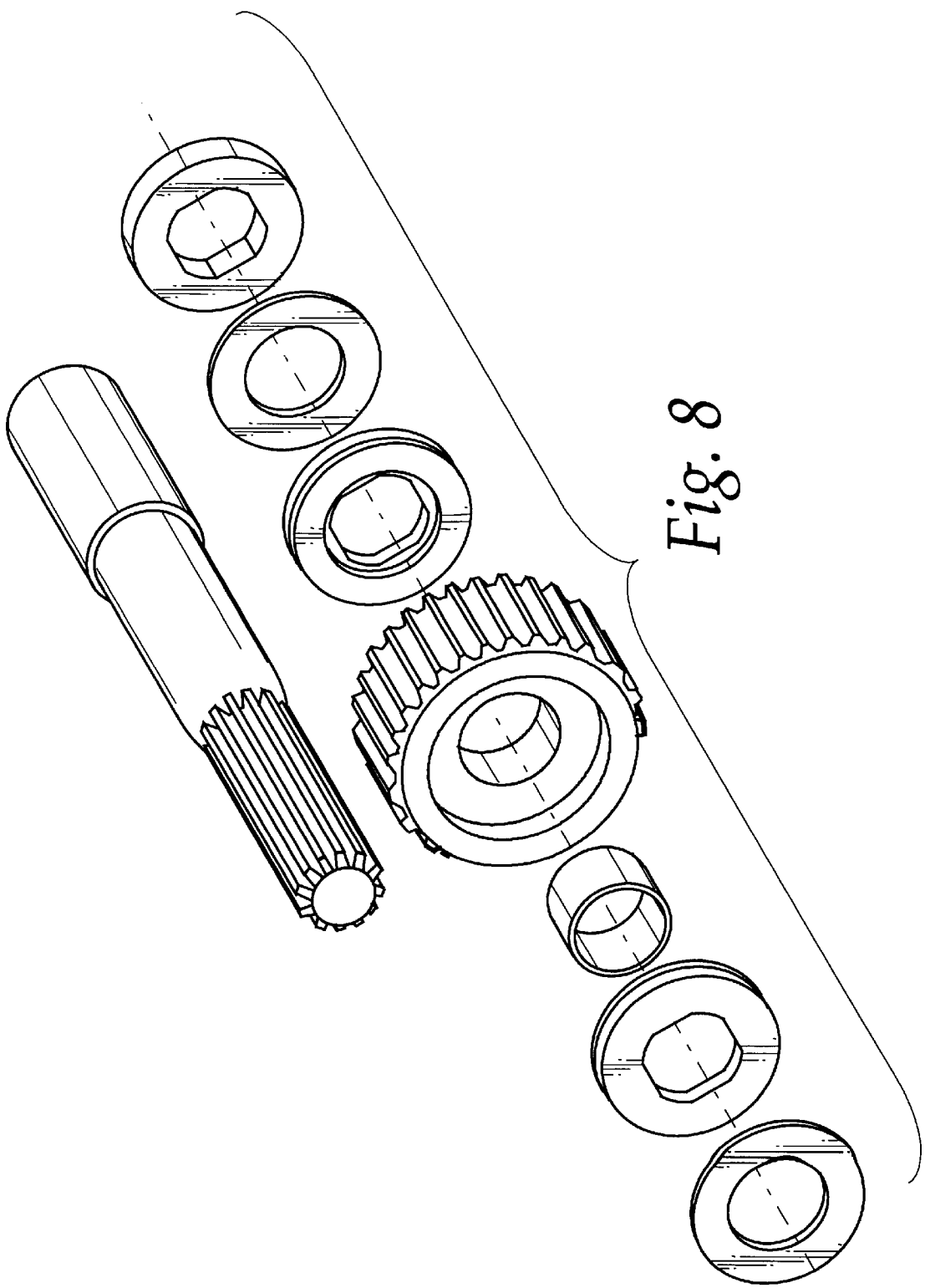
FIG. 8 is an enlarged view shown of FIG. 7.

FIG. 1 illustrates a circular saw having a clutch assembly 10 that is made in accordance with the principles of the present invention. As shown, the saw includes a housing 12 that supports a motor (not shown) that is powered in any known manner, such as by a battery or an AC source. Configured at the distal end, the motor rotates a shaft 14 that includes a pinion 16 having multiple teeth 18. As is known in the art, the shaft 16 is supported by a bearing assembly 20 that is supported between the housing 12 and a shoulder 22 formed on the shaft.

As will be described in more detail below, the motor driven shaft 16 engages the clutch assembly 10 to rotate a blade shaft 24. The blade shaft 24 has a first end 26 and a second end 28. The first end 26 is configured within the housing and is supported by a bearing assembly 30. The bearing assembly 30 is pressed against a first shoulder portion, or ledge, 32 formed proximate the first end of the blade shaft 24. The blade shaft also includes a second shoulder portion, or ledge, 34 located at the approximate the longitudinal center of blade shaft 24. As seen in FIG. 2, the blade shaft 24 includes multiple flat sections 36 extending longitudinally between the first and second ledges 32 and 34.

A longitudinal hole 38 is formed in the second end 28 such that the rotational axis of the hole 38 corresponds to the rotational axis of the blade shaft 24. Preferably, the hole 38 is configured with threads. The second end 28 extends out of the housing 18 and is supported by a bearing plate 40. Saw blade 42 is held in position on the blade shaft 24 by a bolt 46 and washers 47 and 48. In order to secure the bolt 46 to the blade shaft 24, the bolt has a threaded end that engages with the threaded hole 38. In the preferred embodiment, the bolt can be a wrenchless bolt that is tightened into the threaded hole 38 by hand. The principles of the present invention can also use a bolt that must be tightened by a wrench. Regardless of the type of bolt 46 used, the blade is secured between the washers 47 and 48 that drive the blade by friction applied by the bolt. Alternatively, the washer 47 and the shaft 24 can be arranged so that the blade's square hole, if so configured, (not shown) is keyed to the washer 47. The bolt holds the assembly together so that the blade rotates with the shaft 24. Because the saw is configured with the clutch assembly 10, any amount of torque can be used to tighten the bolt 46.

In one embodiment of the present invention, shown in FIGS. 1, 7 and 8, the clutch assembly 10 includes a clutch gear 50, first and second shaft washer 52 and 54, and first and second spring washers 56 and 58. Spring washers 56, 58, are preferably Belleville washers but can be any sort of suitable spring types. The clutch gear 50, shown in FIGS. 1, 3 and 4, is a cylindrical band having a center bore hole 60. The diameter of bore hole 60 is slightly larger than the diameter of the blade shaft 24 towards the first end 26 and between the ledge 32 and ledge 34. Thus, the clutch gear 50 fits over the second end of the blade shaft 24. Multiple teeth 62 extend radially from the outer surface 64 of the clutch gear 50 which can be arranged as a spur gear, helical gear, worm gear or other known configuration. In addition, the clutch gear 50 is configured with a first lip 66 at its fist end 68 and a second lip 70 at its second end 72. A bearing friction is provided between the clutch gear and the blade shaft. A cylindrical bearing 74 can be positioned within the bore hole 60 so that the bearing 74 is between the clutch gear 50 and the blade shaft 24. The bearing 74 assists in the operation of the clutch assembly 10 and prevents galling between the clutch gear 50 and the blade shaft 24. The bearing friction can also be provided between the washers and the clutch gear.

Referring to FIGS. 5 and 6, the shaft washers 52, 54 have a disc shape with a hole 76 at the center. In the preferred embodiment, the hole 76 can have multiple flat sections 80 that correspond to the flat sections 36 formed on the blade shaft 24. As shown at least one outer surface of the shaft washers can be coated with a frictional substrate, or layer, 78. The frictional layer 78 can be any suitable material that increases the coefficient of friction of a steel core, such as bronze, any composite frictional material commonly used for automotive brake pads and the like, or any material that will not weld itself to or gall the gear. The materials used as the frictional layer are also wear resistant. In addition, the coefficient of friction can be adjusted under the appropriate force from the spring washers as well as the friction between the materials. If the friction material has the necessary mechanical properties to withstand the stresses from the shaft washer and shaft interface, the shaft washer can be made from a solid friction material, e.g. bronze. The coefficient of friction can range between $0.15\mu$ and $0.6\mu$, although applications can dictate the requirement for coefficients outside this range.

As stated, the clutch assembly 10 is positioned over the first end 26 of the shaft 24. The first spring washer 56 is pushed against the second ledge 34 and is adjacent the first shaft washer 52. The frictional layer 78, if applicable, of the first shaft washer points toward the blade shaft's first end 26. The clutch gear 50 is positioned along with the bearing 74 against the washers 56 and 52. The first spring washer 56 and first shaft washer 52 fit within the inner surface of first lip 66 so that the spring washer 56 biases the shaft washer 52 against the clutch gear 50. As shown, the frictional layer 78 of first shaft washer engages with surface at the first end 68 of clutch gear 50.

The second shaft washer 54 is pressed against the surface of the second end 72 of clutch gear 50. Similar to the first shaft washer 52, the frictional layer 78 of second shaft washer 54 engages with the surface of the second end 72. The second spring washer 58 is pressed against the second shaft washer 54 and is proximate the first end 26 of blade shaft 24 and bias the shaft washer against the clutch gear. The second spring washer 58 and second shaft washer 54 fit within the inner surface of second lip 70. A press-fit washer 82 is positioned over the blade shaft 24 to hold the clutch assembly in position. The press-fit washer is positioned to ensure that spring washers force the frictional layers to bear against the clutch gear. Of course, other suitable means of holding the clutch assembly to the shaft can be used, such as snap rings and the like.

In operation, the shaft 14 is rotated by the saw's motor. As the pinion teeth 18 engage with the clutch gear's teeth 62, the clutch gear 50 is rotated about the shaft 24 and the bearing 74. If the blade 42 is not locked by the work piece, the coefficient of friction between the frictional layer 78 and the end surfaces of the clutch gear 50 will be sufficient for the clutch gear 50 to rotate the shaft washers 52, 54. As the flat sections 80 of the shaft washers 52, 54 mate with the flat sections 36 of the blade shaft 24, the clutch assembly 10 rotates the shaft 24 and therefore the blade 42.

If the blade 42 is locked during the operation of the saw, the torque produced by the pinion 16 and the clutch gear on the blade shaft 24 will overcome the friction of the frictional layers 78. Thus, the clutch gear 50 will continue to rotate about the bearing 74 while the blade shaft 24, shaft washers 52, 54 and spring washers 56, 58 remain locked by the blade 42. When the blade is released from the locked position, the shaft 24 will rotate again when the friction on the frictional layer 78 is sufficient to be rotated by the clutch gear 50. It will be appreciated that the friction of the frictional layer 78 can be adjusted depending upon the purpose and need of the tool. Those adjustments can be made by changing the frictional material and the diameter of the shaft washers.

Figure 9:
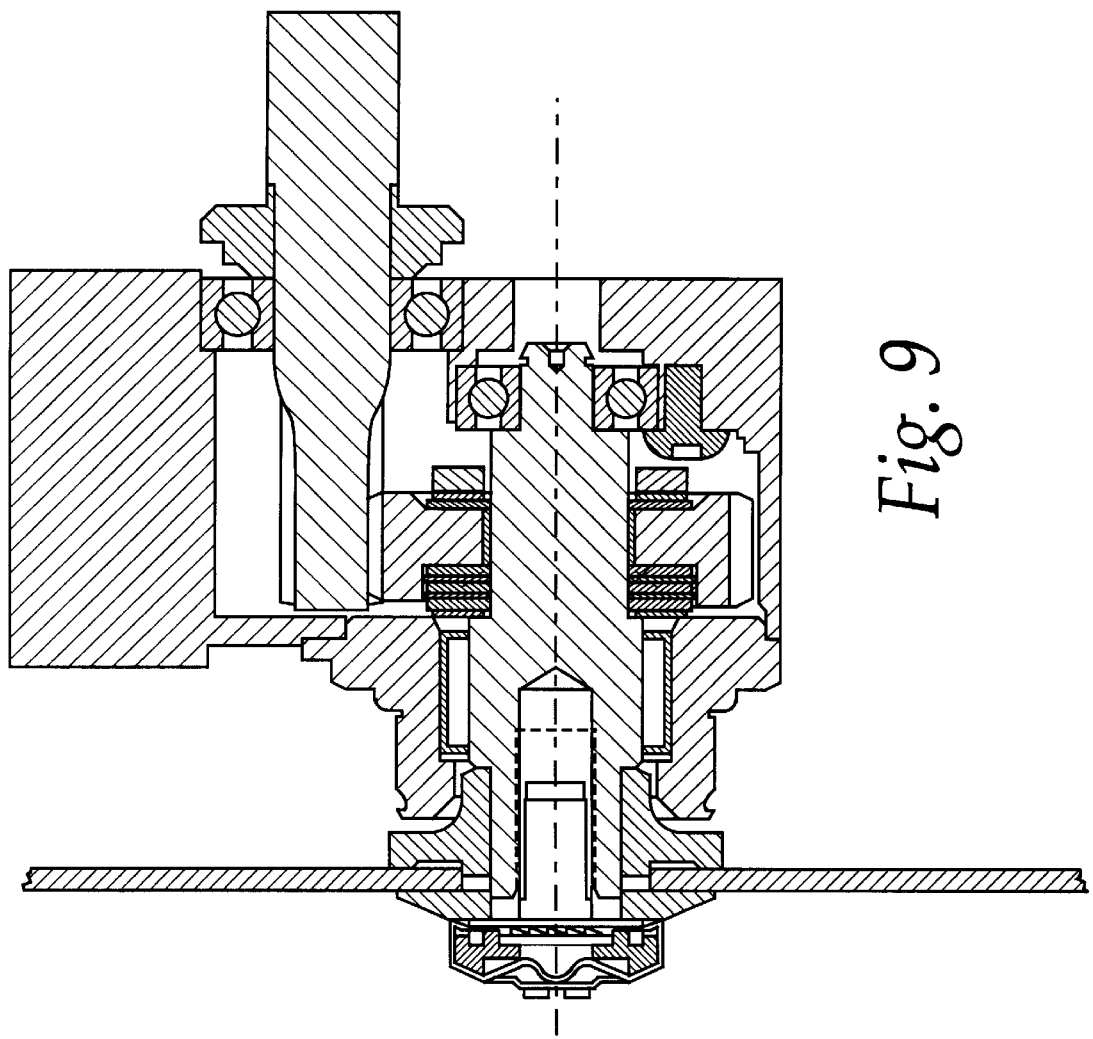
FIG. 9 is a cross-sectional view of an alternative embodiment of the clutch assembly of the present invention.
Figure 12:
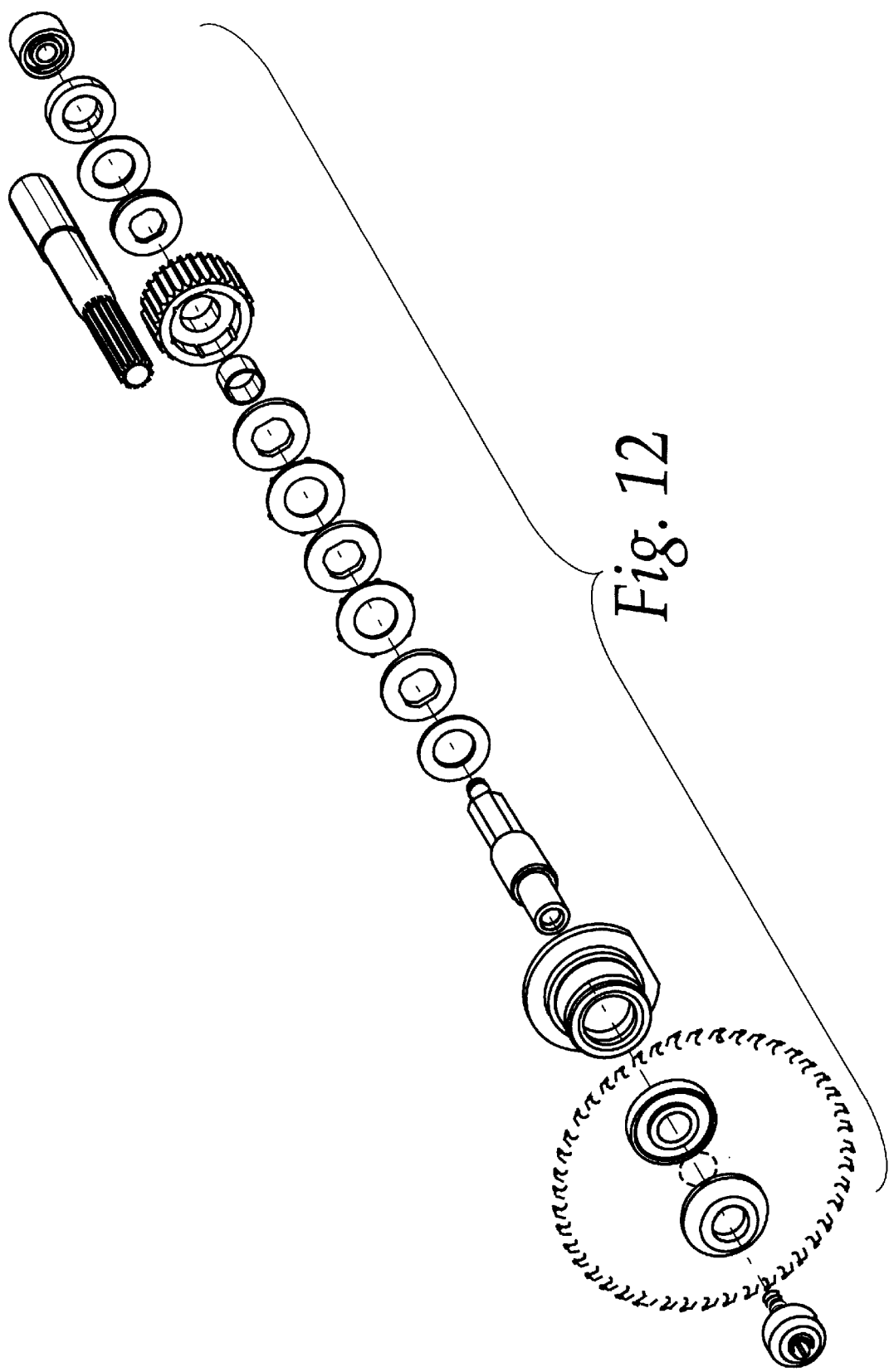
FIG. 12 is an exploded view of the clutch assembly shown in FIG. 9.
Figure 13:
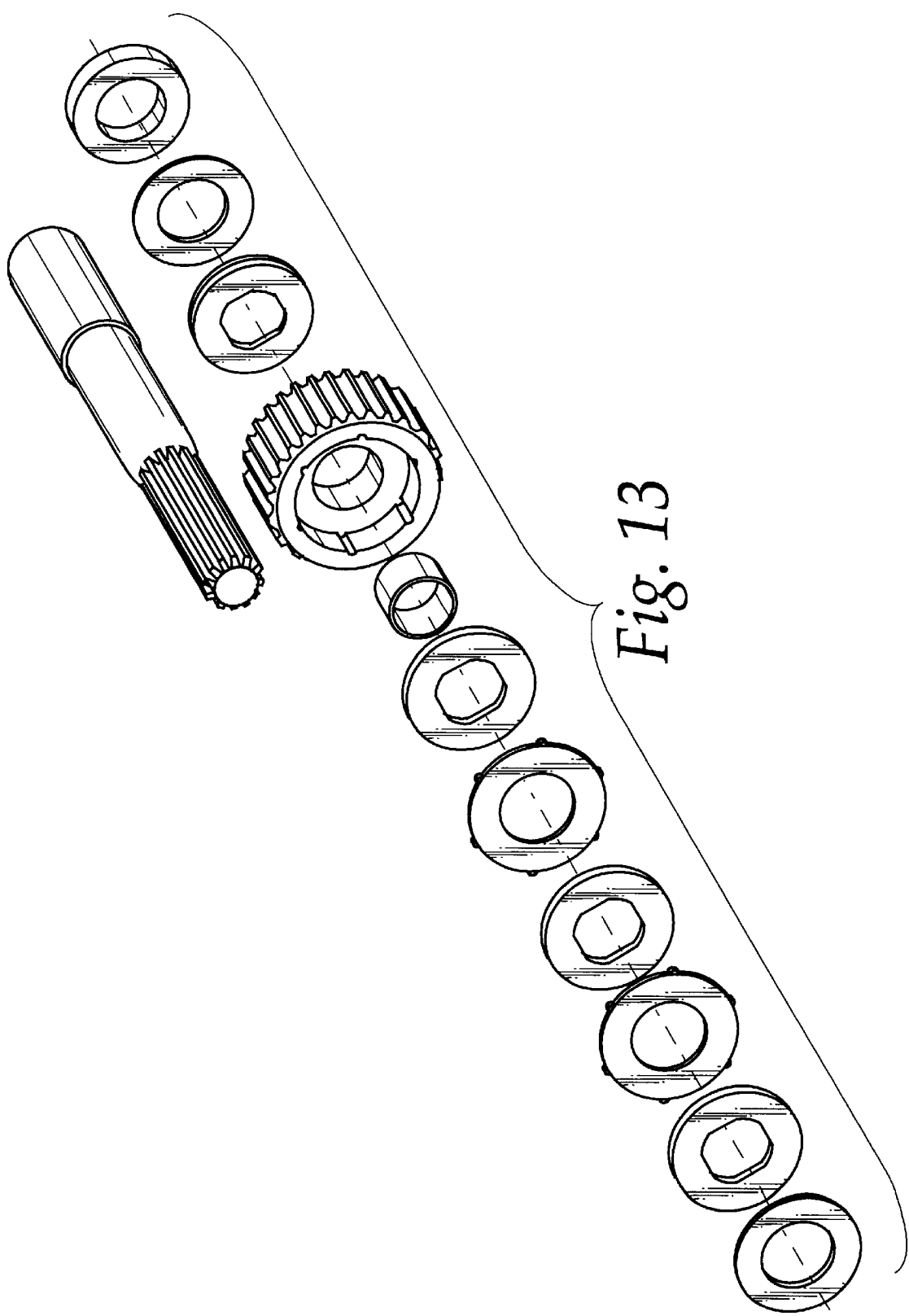
FIG. 13 is an enlarged view shown in FIG. 12.
Figure 9:
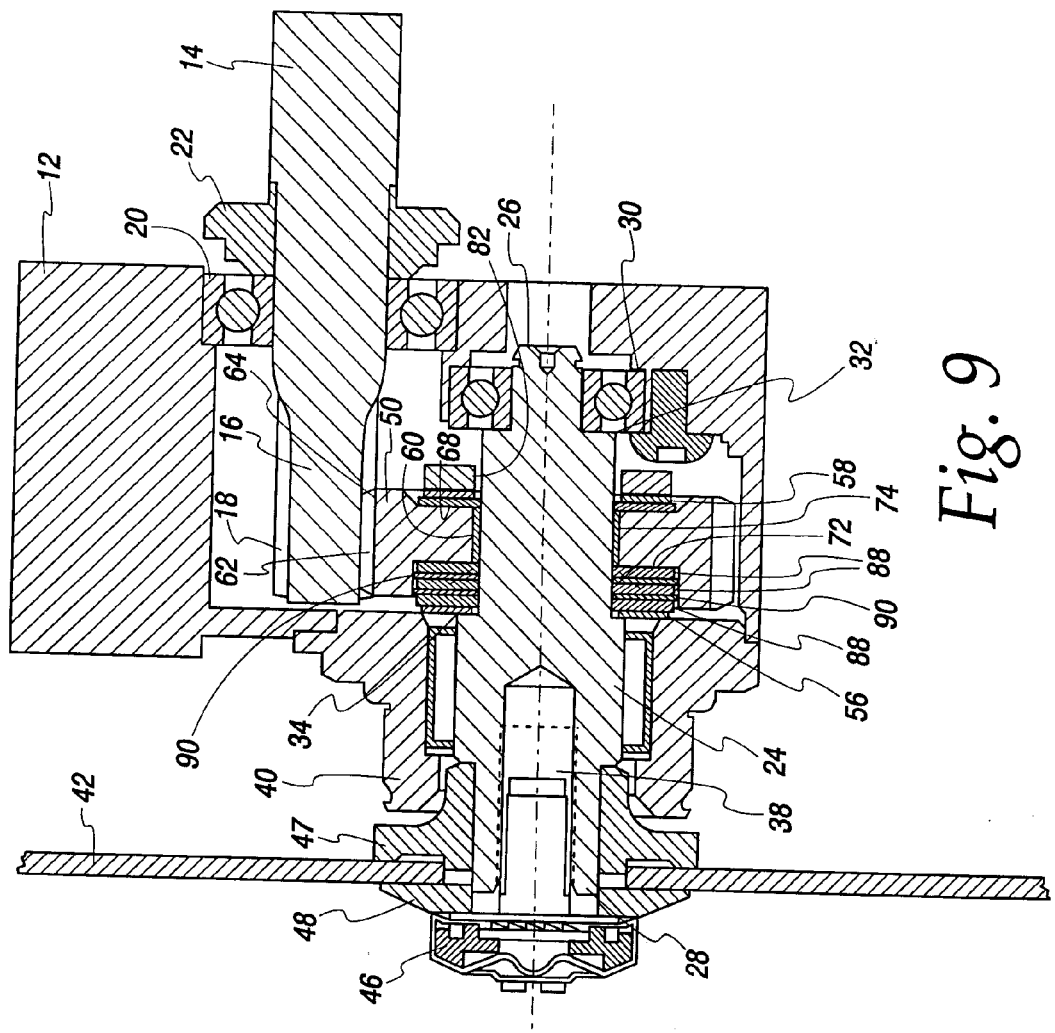
Figure 13:
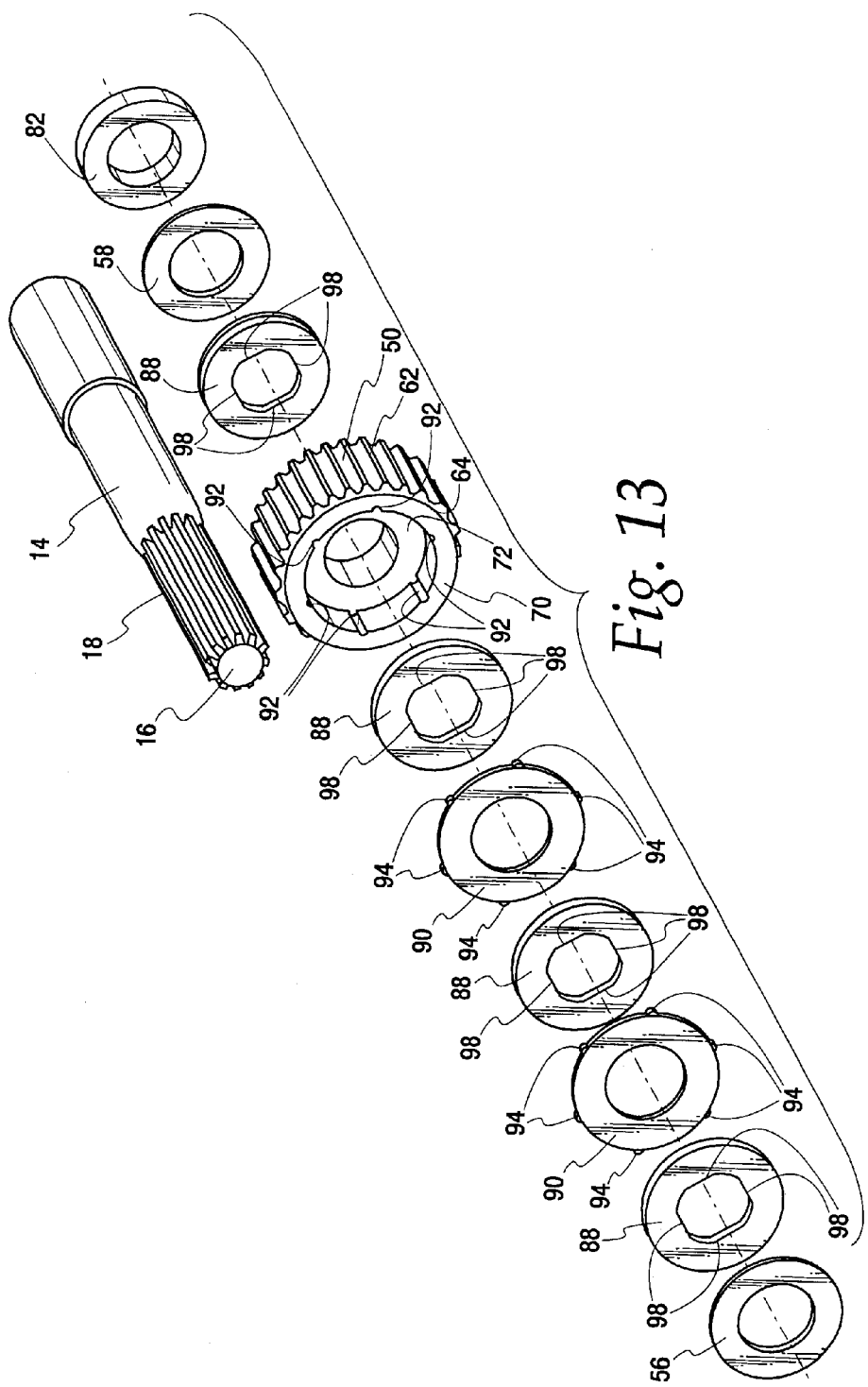

An alternative embodiment of the clutch assembly 10 of the present invention is shown in FIGS. 9, 12 and 13. In this alternative embodiment, the clutch assembly includes at least one lamination of shaft washers 88 and gear washers 90 positioned adjacent to one end of the clutch gear 50. It is noted that the shaft washers and gear washers are not bonded in the lamination. In the preferred embodiment, lamination is configured between the clutch gear 50 and the second ledge 34. In further embodiments, a lamination is configured on the other side of the clutch gear 50 or at least one lamination is provided on each side of the clutch.

For the embodiment shown in FIGS. 9, 12 and 13, the clutch gear 50 is the same manufactured clutch gear as that used in the embodiment shown in FIG. 1 with the second end 50 facing the blade 42. It will be appreciated that a clutch gear manufactured specifically for this embodiment can be used. Referring to FIG. 3, multiple notches 92 are configured into the inner surface of the second lip 70. As shown, the notches 92 are evenly spaced around the inner surface. Referring to FIGS. 10–11, gear washers 88 have disc shape with a center hole 94. Around the outer perimeter of the washers 88, multiple tabs 94 are configured. The shape of tabs 94 corresponds to the shape of notches 92, and the tabs 94 are spaced so that the gear washers fit within the second lip 70. Shaft washers 90 are configured similar to shaft washers 52 and 54 and have a disc shape with a center hole having flat sections. In the preferred embodiment, the shaft washers 90 are made of bronze, an aluminum bronze alloy, or any compatible material that will not weld to or gall the gear washer or clutch gear. The material must also withstand the driving forces from the shaft. A frictional layer can be added to the shaft washer or to the other surfaces.

As shown, the lamination includes at least three shaft washers and the two gear washers. The arrangement of the multiple gear washers and shaft washers in the lamination produce a friction comparable to the friction of the frictional layers 78. To increase or decrease the friction the number of gear washers and shaft washers in the lamination can be adjusted. As the number of shaft washers is increased the load experienced through the lamination during operation of the saw with a blade positioned within the clutch assembly is spread out amount the multiple washers to reduce the load on any one washer. The addition of layers in the lamination also provides more surfaces, which requires less of a load on the spring washers from the same slip torque. As will be appreciated by one skilled in the art, there are multiple arrangements for the washers within the clutch assembly to control the slip torque.

Similar to the first embodiment, the clutch assembly 10 is positioned over the second end 28 of the shaft. The first spring washer 56 is pushed against the second ledge 34. The lamination of gear washers and shaft washers is positioned over the shaft 24 against the spring washer 56. The flat sections 98 of the shaft washers 90 mate with the flat sections 36 of the blade shaft 24. The two gear washers 88 are sandwiched between the three shaft washers 90. Using the clutch gear described, the second end 70 is positioned so that the second lip surrounds the lamination. The tabs 94 on the gear washers fit in the notches 92 formed in second lip 70. The bearing 74 is placed between the clutch gear 50 and the shaft 24. Another shaft washer 90 is pressed against the surface of the first end 66 of clutch gear 50. The second spring washer 58 is pressed against the shaft washer 90 and is proximate the first end 26 of blade shaft 24. The spring washer 58 and shaft washer 90 fit within the inner surface of first lip 70. The spring washers 56, 58 are arranged to bias the lamination and the shaft washer adjacent the first end 68 against the end surfaces of the clutch gear 50. The press-fit washer 82 is positioned over the blade shaft 24 to hold the clutch assembly in position. The press-fit washer is positioned to ensure that the lamination and the shaft washer 90 bear against the clutch gear. The use of the press-fit washer also adjusts for the tolerances between the gear washers and shaft washers.

In operation of this alternative embodiment, the pinion teeth 18 engage with the clutch gear's teeth 62 and the clutch gear 50 is rotated. The arrangement of the tabs in the notches causes the clutch gear to rotate the gear washers. As the spring washers 56, 58 bias the clutch assembly's components together, the coefficient of friction between gear washers 88 and shaft washers 90 rotate the shaft washers 90 when the blade 42 is not locked. Accordingly, the flat sections 98 rotate the blade shaft 24 by flat sections 36. Thus, the clutch assembly 10 rotates the shaft 24 and therefore the blade 42.

If the blade 42 is locked during the operation of the saw, the torque produced by the pinion 16 and the clutch gear will overcome the friction between the gear washers and the shaft washers in the lamination as well as the friction between the shaft washer and the first end 68 of clutch gear 50. Thus, the clutch gear 50 will continue to rotate about the bearing 74 while the blade shaft 24, shaft washers 90 and spring washers 56, 58 remain locked by the blade 42. When the blade is released from the locked position, the shaft 24 will rotate again when the coefficient of friction between the gear washers 88 and shaft washers 90 is sufficient to be rotated by the clutch gear 50.

Although the present invention has been described in considerable detail with reference to certain preferred versions, other versions are possible. Therefore, the spirit and scope of the appended claims should not be limited to the description of the preferred embodiment described.

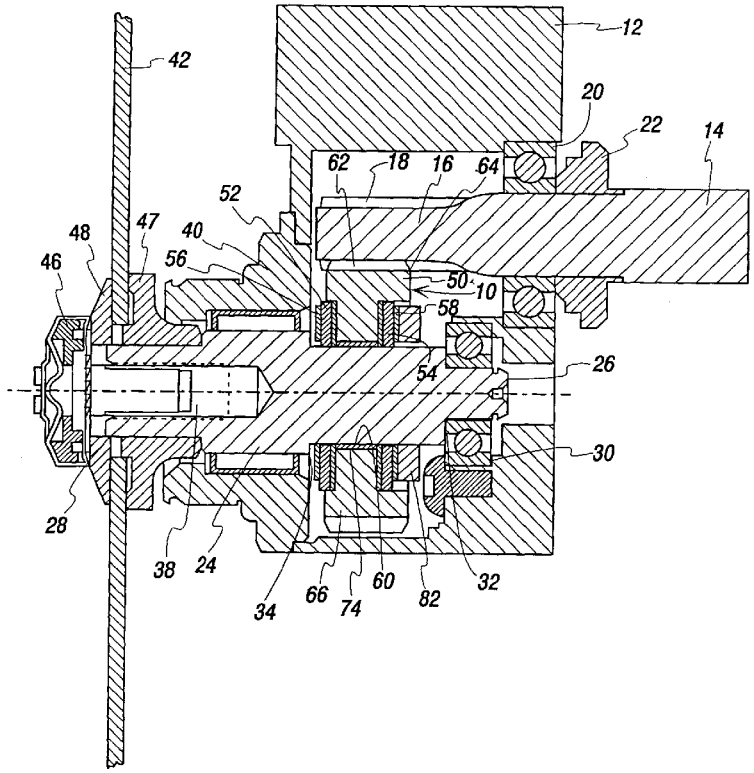

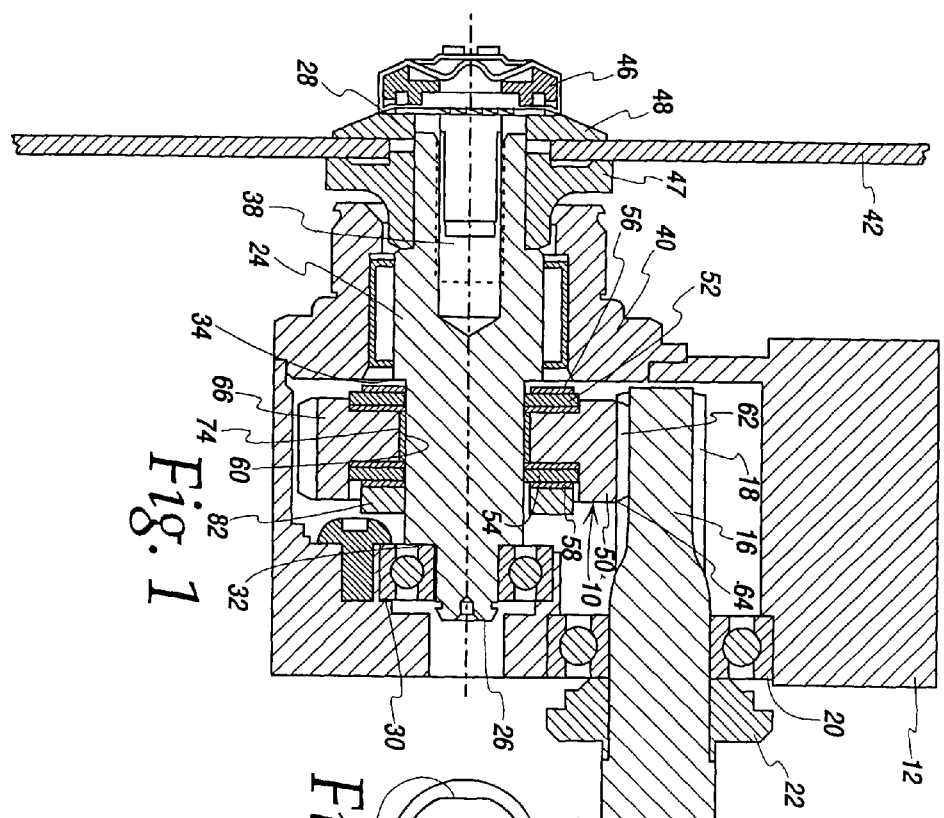
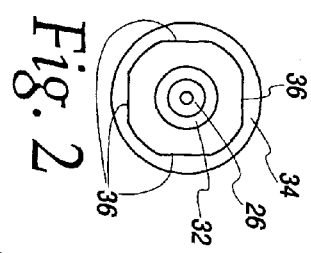
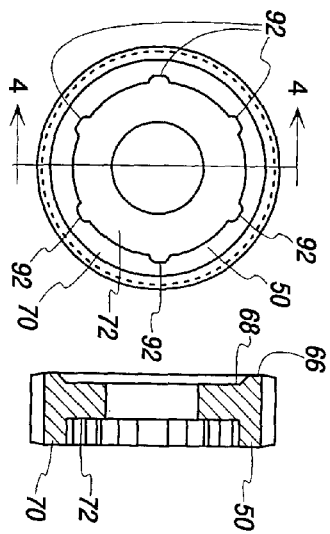
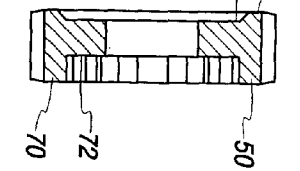
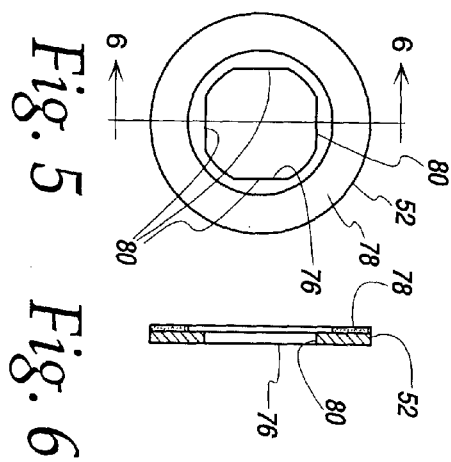

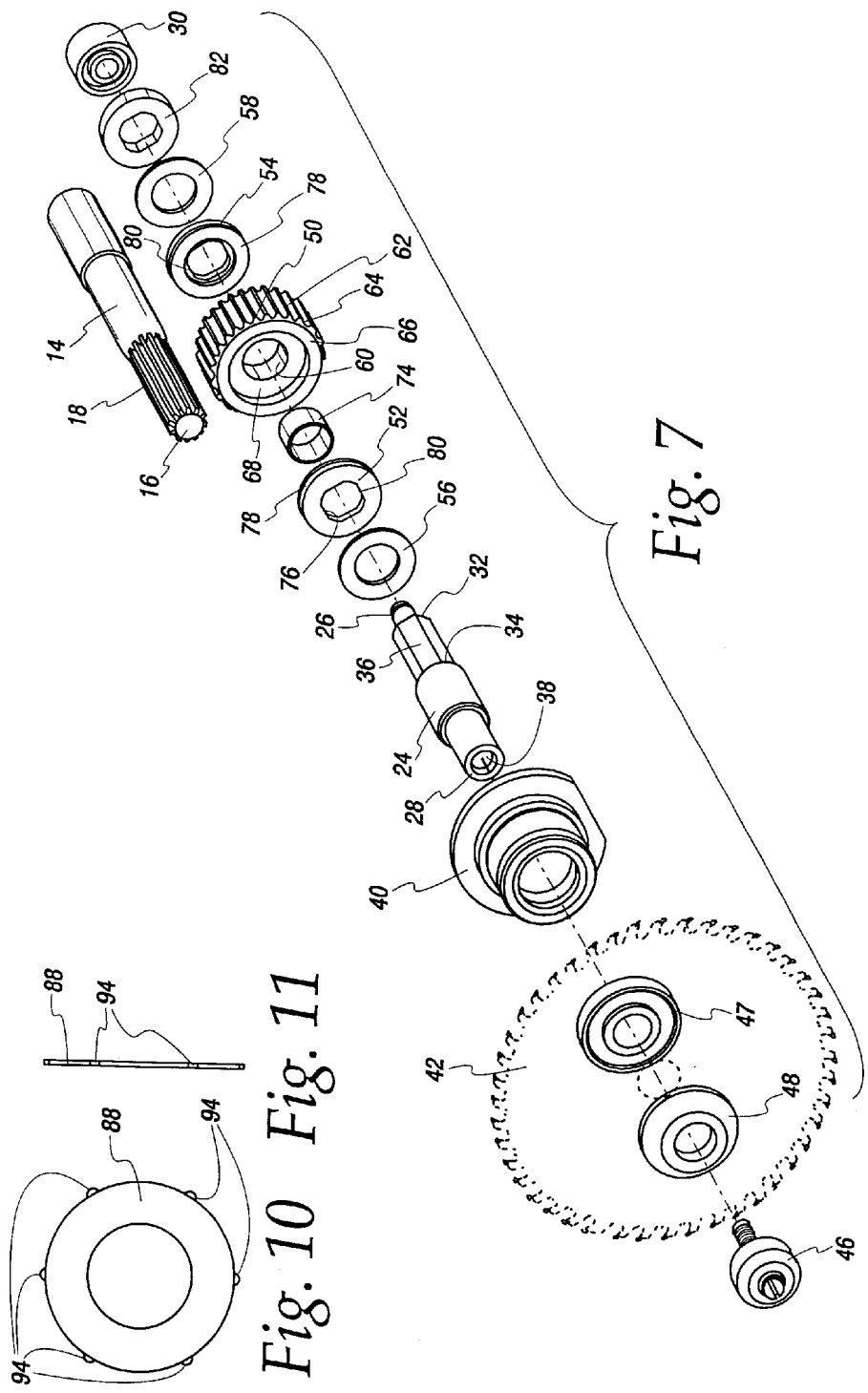

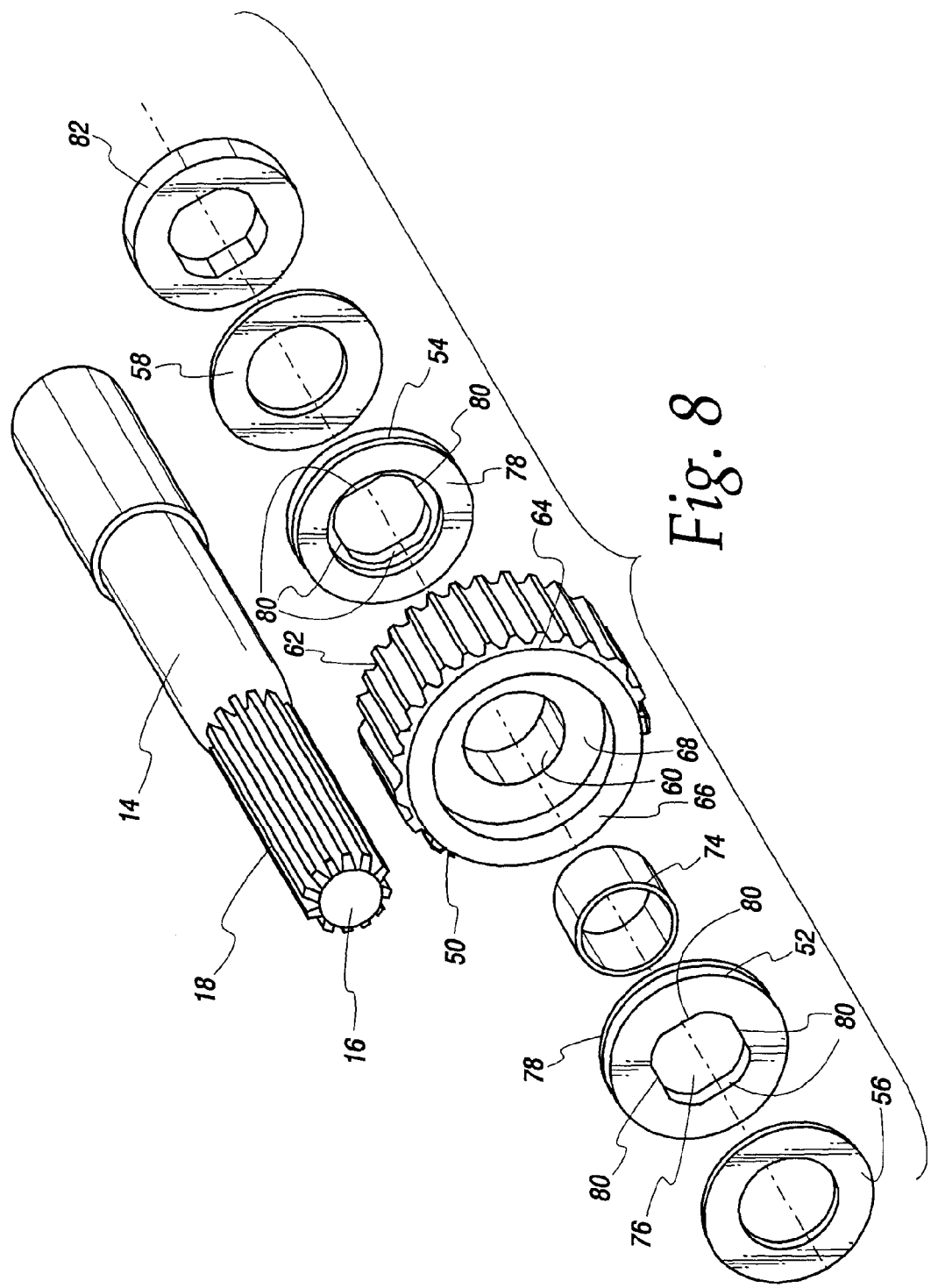

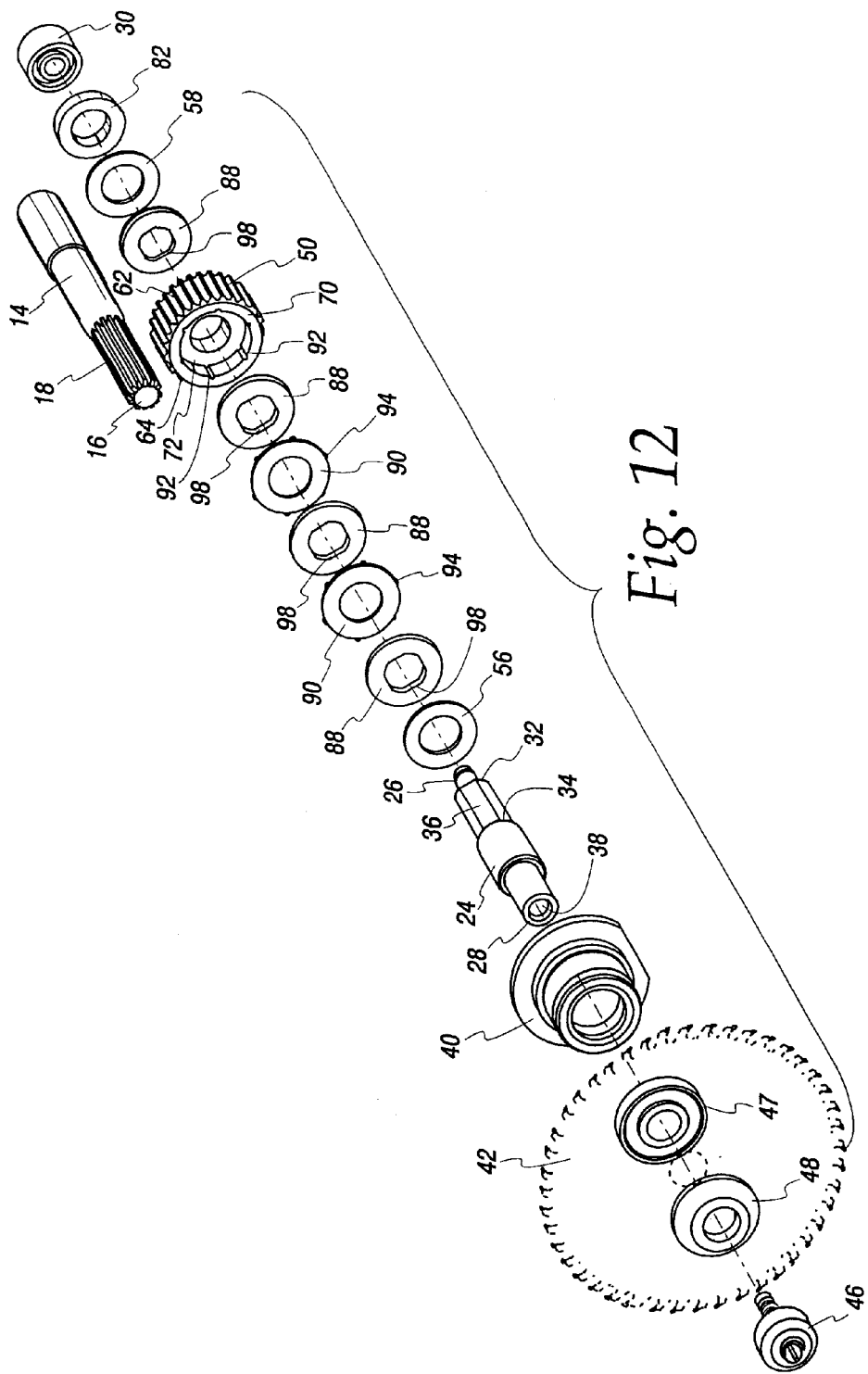

What is claimed is:

1. A circular saw comprising:
    a rotating shaft having a radially extending pinion at one end;
    a blade shaft to rotate a saw blade, the blade shaft having a first end and a second end wherein the blade is secured to the second end by a fastener, and
    a clutch assembly surrounding the first end of the shaft wherein the clutch assembly includes: a clutch gear having a center hole through which the first end of the clutch shaft extends and a gear arrangement around the outer perimeter to engage with the pinion, a first and a second spring means positioned on either side of the clutch gear, and a first and second shaft washer pressed against the clutch gear by the spring means, and
    wherein the pinion rotates the clutch assembly to drive the blade shaft, and the clutch, and the clutch assembly overcomes the torque between the clutch gear and the clutch shaft when the clutch shaft is locked by the blade.

2. The circular saw according to claim 1 wherein the shaft washers have a core and at least one side coated with a frictional material to engage with the clutch gear.

3. The circular saw according to claim 2 wherein the frictional layer has a coefficent of friction between $0.15\mu$ and $0.6\mu$.

4. The circular saw according to claim 1 further comprising a bearing positioned between the gear shaft and the gear clutch.

5. The circular saw according to claim 1 wherein the fastener is a bolt engaged in a hole longitudinally formed in the second of the clutch shaft.

6. The circular saw according to claim 1 further comprising a mechanism to secure to the first end of the clutch shaft to secure the clutch assembly against a ledge formed on the clutch shaft.

7. The circular saw according to claim 1 wherein the shaft washer is made of bronze or other material that does not weld to the clutch gear.

8. The circular saw according to claim 1 wherein the clutch assembly having at least one lamination of shaft washers and gear washers wherein the gear washers fits to the shaft to drive the shaft.

9. The circular saw according to claim 1 wherein the spring means is a spring washer.

10. A circular saw comprising:
a rotating shaft having a radially extending pinion at one end;
a blade shaft to rotate a saw blade, the blade shaft having a first end and a second end wherein the blade is secured to the second end by a fastener, and
a multi-surface clutch assembly surrounding the first end of the clutch shaft wherein the clutch assembly includes: a clutch gear having a center hole through which the first end of the clutch shaft extends and a gear arrangement around the outer perimeter to engage with the pinion, a laminated washer assembly positioned on one side of the clutch gear having at least one gear washer sandwiched between shaft washers, and a gear washer and a spring means on the other side of the clutch gear, and
wherein the pinion rotates the clutch assembly to drive the blade shaft, and the clutch assembly, and the clutch assembly overcomes the torque between the clutch gear and the blade shaft when the clutch shaft is locked in position by the blade.

11. The circular saw according to claim 10 further comprising a bearing positioned between the gear shaft and the gear clutch.

12. The circular saw according to claim 10 wherein the fastener is a bolt engaged in a hole to longitudinally formed in the second end of the clutch shaft.

13. The circular saw according to claim 10 further comprising a mechanism secured to the first end of the clutch shaft to secure the clutch assembly against a ledge formed on the clutch shaft.

14. The circular saw according to claim 10 wherein the shaft washer is made of bronze or other material that will not weld to the clutch gear and gear washer.

15. The circular saw according to claim 10 wherein the clutch shaft includes a cylindrical lip at the one end of the clutch and the laminated washer assembly is positioned within the lip.

16. The circular saw according to claim 15 wherein the cylindrical lip includes notches formed on an inner surface and the gear washers include tabs formed along an outer perimeter of the gear washers wherein the tabs fit in the notches so that the gear washers rotate the gear clutch.

17. The circular saw according to claim 10 wherein the lamination has a coefficient of friction between $0.15\mu$ and $0.6\mu$.

18. The circular saw according to claim 10 wherein the spring means is a spring washer.

19. A power tool comprising:
a rotating shaft;
a second shaft having a first end and a second end wherein a member is secured to the second end, and
a clutch assembly positioned between the rotating shaft and the second shaft wherein the rotating shaft rotates the clutch assembly drive the second shaft and the member and wherein the clutch assembly overcomes the torque between the clutch assembly and the second shaft when the member is locked while the rotating shaft rotates.

20. The power tool according to claim 19 where the clutch assembly comprises:
a clutch gear engaged with the rotating shaft;
a first and second shaft washer to drive the second shaft having a frictional layer engaging the clutch gear, and
a first and second spring means to bias the frictional layer against the clutch gear wherein the torque of the clutch gear overcomes a friction of the frictional layer when the member is locked.

21. The power tool according to claim 19 wherein the clutch assembly comprises:
a clutch gear engaged with the rotating shaft and
at least one lamination of gear washers and shaft washers wherein the clutch gear rotate the gear washers and the shaft washers drive the second shaft wherein the torque of the clutch gear overcomes a friction between the gear washers and shaft washers when the member is locked.

22. The power tool according to claim 19 wherein the power tool is a circular saw and the member is a blade.

23. The circular saw according to claim 6 wherein the mechanism is a press-fit washer.

24. The circular saw according to claim 13 wherein the mechanism is a press-fit washer.

* * * * *

UNITED STATES PATENT AND TRADEMARK OFFICE
CERTIFICATE OF CORRECTION

PATENT NO. : 6,295,910 B1
DATED : October 2, 2001
INVENTOR(S) : D. Childs et al.

It is certified that error appears in the above-identified patent and that said Letters Patent is hereby corrected as shown below:

The title page should be deleted to appear as per attached title page.

The sheets of drawings consisting of figures 1-13 should be deleted to appear as per attached figures 1-13.

Signed and Sealed this

Sixteenth Day of September, 2003

JAMES E. ROGAN
*Director of the United States Patent and Trademark Office*

United States Patent
Childs et al.

(10) Patent No.: US 6,295,910 B1
(45) Date of Patent: *Oct. 2, 2001

(54) CLUTCH ASSEMBLY FOR USE WITH A CIRCULAR SAW

(75) Inventors: Daniel K. Childs, Forest Park; Michael Holzer, Wauconda, both of IL (US); Jan P. Houben, Poppel (BE)

(73) Assignee: S-B Power Tool Company, Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/374,018

(22) Filed: Aug. 13, 1999

(51) Int. Cl.$^7$ .................................................. B26B 5/08

(52) U.S. Cl. ............... 83/698.11; 83/543; 83/698.41; 192/55.1; 192/150; 192/48.3; 81/476

(58) Field of Search .................. 192/55.1, 56.1, 192/150, 48.3; 173/171, 176, 216; 83/543, 571, 698.11, 698.41; 81/476

(56) References Cited

U.S. PATENT DOCUMENTS

| | | |
|---|---|---|
| 1,564,342 | 12/1925 | Gebhardt et al. . |
| 2,427,153 | 9/1947 | Mossberg ................... 81/52.4 |
| 2,482,387 | 9/1949 | Veneman ................... 81/52.4 |
| 2,675,835 * | 4/1954 | Kiekhaefer ................. 83/543 |
| 2,917,147 | 12/1959 | Finn ........................ 192/150 |
| 3,038,576 | 6/1962 | Simpson .................... 192/150 |
| 3,214,773 | 11/1965 | Benjamin et al. ............ 10/135 |
| 3,315,773 | 4/1967 | Aschauer ..................... 192/48 |
| 3,498,434 | 3/1970 | Richmond ................... 192/150 |
| 3,503,478 | 3/1970 | Neumann ..................... 192/35 |
| 4,496,136 | 1/1985 | Maeda ....................... 254/350 |
| 4,776,442 | 10/1988 | Young ....................... 192/56.1 |
| 4,883,152 | 11/1989 | Froment ...................... 192/42 |
| 4,949,587 | 8/1990 | Oka .......................... 74/333 |
| 5,107,737 * | 4/1992 | Tagliaferri ................ 83/698.41 |

* cited by examiner

*Primary Examiner*—W. Donald Bray
(74) *Attorney, Agent, or Firm*—Gardner, Carton & Douglas

(57) ABSTRACT

A circular saw includes a clutch assembly to surround the rotating blade shaft of the saw. The blade shaft is rotated by a shaft having a gear at one end. The clutch assembly includes a clutch gear to engage with the rotating pinion. The clutch gear is held to the blade shaft by a shaft washer that has a frictional material laminated to one end. The shaft washer is pressed to the clutch gear by spring washers.

24 Claims, 6 Drawing Sheets